United States Patent Office 2,970,129
Patented Jan. 31, 1961

2,970,129

GRAFT COPOLYMER OF POLYETHYLENE AND POLYMERIZABLE ACRYLIC COMPOUNDS, PROCESS FOR PREPARING SAME, AND COMPOSITION THEREOF

Frank M. Rugg and James E. Potts, West Caldwell, N.J., assignors to Union Carbide Corporation, a corporation of New York No Drawing. Filed Nov. 15, 1956, Ser. No. 622,240

10 Claims. (Cl. 260—45.5)

This invention relates to polymerization products derived from polyethylenes. More particularly, it relates to thermoplastic, heat-stable reaction products of polyethylene and acrylic acid, methacrylic acid and their corresponding alkyl substituted amides.

Polyethylenes can be obtained by the polymerization of ethylene in the presence of a catalyst to form products ranging from low molecular weight oils and greases to normally solid polymers having molecular weights above about 100,000. These polymers may be prepared employing various pressure media, i.e. superatmospheric, atmospheric or subatmospheric pressures. Illustrative methods using superatmospheric pressure are described in United States Patents 2,153,553 and 2,188,465.

Polyethylenes are outstanding in chemical inertness. The physical properties of the polyethylenes having molecular weights ranging from 18,000 to 30,000 are characterized by their good toughness and pliability over a wide range of temperatures. The electrical properties are particularly outstanding.

Despite these outstanding chemical and physical properties of the polyethylenes there have been certain limitations to their use. Their non-polar structure makes it difficult to print or apply a coating to the surface of the polyethylene film. The films also do not adhere well to other surfaces, and no generally satisfactory adhesive for polyethylene films is known. Harder surfaced polyethylene films would also be desirable since the present films are readily abraded and scratched.

A number of attempts have been made to improve the limiting properties of the polyethylenes, for example by mechanically incorporating other polymers or by polymerizing ethylene monomer (E) in the presence of another monomer such as vinyl chloride (V), to form copolymers which may be represented diagrammatically as follows:

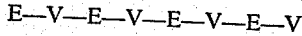

in which E represents an ethylene segment and V the other monomeric residue.

Still another method is to interrupt the polymerization of a particular monomer at some intermediate state and then add ethylene which supposedly adds to segments of the polymerized monomer (V) forming a so-called segmented polymer which can be represented thus:

where E is the ethylene segment and V the other monomeric segment.

While these methods have given polyethylenes which, in some cases do have better adhesion, the products have these somewhat better properties usually at a sacrifice of the good properties of polyethylenes. Thus, the mechanical mixtures of polymers usually blush when creased or cold drawn. The copolymerization of ethylene with other monomers is not easy to control and the resulting product is radically different in properties from polyethylene. Methods which involve oxidation of the polyethylene are to be avoided since the products obtained often show a marked reduction in such properties as mechanical strength and heat sealability.

This invention, therefore, is concerned with a method for preparing polyethylene graft copolymers which does not bring about a degradation of the desirable properties of polyethylene but which provides graft copolymers containing at least one percent and as much as 20 percent by weight of acrylic acid, methacrylic acid or their corresponding alkyl substituted amides as described hereinbelow grafted to said polyethylene. These graft copolymers having molecular weights up to approximately 10,000 are uniquely capable of forming emulsions which are of particular utility as adhesive and protective coatings, e.g. for polishes, electric wiring and paper coating for food storage packaging. Graft copolymers of higher molecular weights above 10,000 form films having excellent adhesion as coatings particularly to cellophane and aluminum foil. Thus, this invention provides a process in which the polyethylenes are used in their completed homopolymeric form, i.e. homopolymers of ethylene of different molecular weights are employed but the molecular weight of these homopolymers does not decrease in the process of modification. Instead, it is increased by a process which has been aptly termed a "grafting process." Pictorially, this can be represented as follows:

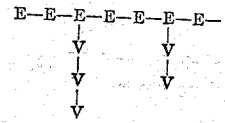

where E represents an ethylene segment and V a monomeric segment of a monomer other than ethylene.

Generally speaking, in order to bring about grafting the backbone polymer cannot be too chemically inert but should possess certain so-called "active points" to which the graft can attach itself. These "active points" may result, for example, from the presence of some form of unsaturation in the molecule. Thus, monomeric styrene is readily grafted to polybutadiene which is ethylenically unsaturated.

However, due to the chemical inertness and low unsaturation of polyethylene it has not been considered as a material susceptible to grafting. While polyethylene contains certain points, e.g. the tertiary carbon atoms at the points of branching which can become sensitive after prolonged heating as in the milling of polyethylene at high temperatures (150° C.) in contact with air, the sensitivity induced by such drastic treatment results in a cross-linking and curing of the polyethylene and is, therefore, not a method adaptable to grafting.

It has now been discovered that polyethylene can be rendered susceptible to grafting, and in the process disclosed in this invention it is believed, although we do not wish to limit ourselves to any particular theory, that free radicals or active points are created along the main stem or backbone of ethylene homopolymer which active points initiate polymerization of the added monomer. Subsequent propagation of the growing branch by addition of monomer units continues until termination occurs by chain transfer or some other mechanism. The result is that a polymeric side chain or branch is grafted to the main stem or trunk polyethylene molecule.

Thus it has been found that the process to be employed to produce these graft copolymers of polyethylene depends on the following main factors.

(1) The presence of a free radical producing catalyst.
(2) The chemical structure of the monomer to be grafted.
(3) The ratio of monomer to polyethylene.

In addition to these chief factors, it has also been found that the temperature of the reaction and use of solvents are factors which contribute to the attainment of good yields of graft copolymers.

As to the first factor, the presence of a free radical producing catalyst has been found necessary to initiate the graft reaction since otherwise no detectable grafting occurs. Suitable are such catalysts as benzoyl peroxide, acetyl peroxide, 2,4-dichlorobenzoyl peroxide, tert. butyl peroxide, tert. butyl hydroperoxide, peracetic acid, tert. butyl permaleic acid, lauryl peroxide and the like. The most effective and preferred catalyst is benzoyl peroxide. The role played by the catalyst is not clearly understood. Apparently the manner of its functioning is related in some manner to the second factor, i.e. the chemical nature of the monomer since it has been found that monomers vary in the readiness with which they can be grafted. Whether this is accomplished because the catalyst increases the grafting potentiality of the monomer or whether the catalyst renders the polyethylene more susceptible to the grafting of a particular monomer has not been demonstrated.

The third factor influencing grafting, namely the ratio of monomer to polyethylene, functions in this manner. When a vinyl monomer is grafted to polyethylene there occurs concomitantly with the formation of graft copolymer, polymerization to homopolymer of the monomer. This can be graphically represented as follows where E represents an ethylene segment

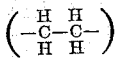

in a polyethylene chain and V represents a monomer segment in a vinyl polymer chain.

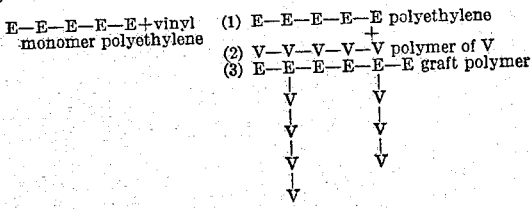

Thus the gross reaction product resulting when a monomer is graft polymerized to polyethylene can comprise some ungrafted homopolymeric ethylene (1), some homopolymer of V (2), and some graft copolymer (3). However, the relative amount of V present as homopolymer compared to that present in the graft copolymer can be controlled by varying the ratio of monomer to polyethylene in the initial mixture of these reactants charged to the reaction vessel. Thus, it has been discovered that as this ratio increases, the proportion of V present as homopolymer also increases. Also, it has been discovered that the maximum ratio at which substantially no homopolymer of V is formed varied with the monomer employed.

To a lesser extent other factors influence the grafting reaction. The amount of catalyst employed is preferably in the range of 0.3 to 10 percent by weight of the monomer. The upper limit for catalyst concentration is an economic rather than a chemical one. No advantage or necessity is seen in employing concentrations in excess of 20 percent of catalyst by weight of monomer. Time and temperature are also lesser factors which influence the reaction. Thus the time required to obtain highest grafting efficiency generally reaches a maximum beyond which it is not practical to go. To some extent this depends on the monomer, that is to say with monomers which graft readily the time required to get maximum grafting differs somewhat from those which are not so readily grafted. Generally speaking, however, most of the graft copolymer is formed during the first 3 to 12 hours of reaction.

The temperature of the reaction is not narrowly critical but should be high enough to keep the polyethylene in solution and to decompose the catalyst into free radicals at a reasonable rate. Thus, 60° C. to 135° C. constitutes a preferred reaction range. Temperatures much above 135° C. tend to decompose some of the monomer and polyethylene homopolymer.

As stated, the gross reaction products obtained by the procedure of this invention are mixtures of unchanged homopolymeric ethylene, graft copolymer and homopolymer derived from the vinyl monomer used in the reaction. The content of this latter can be controlled, as stated, by varying the ratio of the monomer to polymer in the initial reaction charge. Separation of the various components of the reaction product can be accomplished by reason of their different solution behavior. This again will vary with the monomer employed for grafting. In general, however, it is more difficult to separate the graft copolymer from the ethylene homopolymer since usually the solution behavior of the graft copolymer is similar to that of the ethylene homopolymer.

The acrylic acid and amide type graft copolymers with which this invention is concerned are difficult to separate from ethylene homopolymer.

The graft copolymers, when isolated, vary from soft to hard materials depending on the properties of the polyethylene used and also on the monomer used for grafting. Thus, the graft copolymers prepared from so-called polyethylene greases are usually soft, cheesy materials, while those prepared from the higher molecular weight materials are hard, tough thermoplastic materials. They all have a "backbone" of polyethylene as determined by infra-red spectrometry and contain no cross linked materials.

That these graft copolymers are definite compounds and not mere mechanical mixtures of two homopolymers is determined by the fact that they cannot be separated into the respective homopolymers by simple extraction with suitable solvents as would be possible were they mechanical mixtures. Their physical properties also distinguish them from mechanical mixtures of homopolymers in that films prepared from such mixtures crack when flexed and blush when stretched, whereas films prepared from the graft copolymers can be flexed without cracking and do not blush when stretched.

It is not necessary, however, to isolate the graft copolymers to obtain useful products. The above description of modifications which can be made is only illustrative of the versatility of, and usefulness of these graft copolymers.

For many purposes the gross reaction products obtained by graft polymerization are useful as such. These products may range from soft to tough, hard materials. To some extent, this again will depend on the type of polyethylene used, e.g. graft copolymer derived from the low molecular weight polyethylene greases will usually be soft, grease like materials while if a higher molecular weight polyethylene is used then the reaction products will be tough, hard materials.

The content of graft copolymer in these reaction products is of importance. Thus, only minor amounts are required to effect a marked change in the properties of the material.

All such reaction products are thermoplastic and can be formed into films, threads, tubes, rods, sheets, tapes, ribbons and similar shaped forms. For such purposes it is usually preferred to have about 5 to 20 percent of grafted branches by weight of ethylene homopolymer in the composition. In these reaction products the graft copolymer can function as an internal plasticizer to soften and render the polyethylene more pliable, or it may act as a stiffening agent to give greater rigidity to the polyethylene. This will depend to some extent on the amount and character of the grafted chains.

The type of monomers which are suitable for grafting are those which undergo radical initiated polymerization, more commonly referred to as vinyl type of polymerization. The particular type of monoethylenic monomers with which this invention is concerned may be represented by the following generic formula:

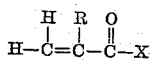

where R is either hydrogen or a methyl group and X is a hydroxy group, or a monoalkyl or dialkyl substituted amino group. The chain lengths of these alkyl substituents are not narrowly critical, however, lower alkyls, either linear or branch-chained and containing 1 to 4 carbon atoms each are generally preferred.

Since the molecular weight of the polyethylene does not affect the amount of grafting, polyethylenes having a wide range of molecular weight can be employed including the so-called polyethylene greases, low molecular weight, hard, polyethylene waxes and the polyethylene resins of higher molecular weight as hereinbefore described.

It has been found that ethylene homopolymer having a molecular weight of 2000 to 10,000 is most advantageously employed in the preparation of emulsions of the grafted copolymer, although polyethylene having an average molecular weight of about 1000 to 10,000 can be employed. Ethylene homopolymer having a molecular weight of approximately 15,000 to 25,000 is preferred for preparing graft copolymer compositions for extrusion coating while ethylene homopolymer of a molecular weight in the range of 10,000 to 40,000 or higher is wholly operative in this regard.

Illustrative of the monomers which it is intended to embrace within the scope of the present invention are in addition to those disclosed in the examples following, N-propyl acrylamide, N-normal butyl acrylamide, N,N-ditert. butyl acrylamide, N,N-dimethyl acrylamide, N,N-diisobutyl acrylamide, N,N-methyl butyl acrylamide and N,N-propyl isobutyl acrylamide.

The reaction is usually carried out in solution employing hydrocarbon and chlorinated hydrocarbon solvents, such as for example, benzene, xylene, heptane, octane, dichloroethane, toluene, cyclohexane, chlorobenzene or carbon tetrachloride. Benzene is the preferred solvent employed. A useful concentration has been found to be one to eight parts by weight of solvent to one part of polyethylene, the lesser amounts of solvent being preferred with the low molecular weight polyethylenes.

The polyethylene is usually dissolved in the appropriate solvent, with the solution heated to reflux temperature. The monomer and catalyst are then added gradually and the reaction mixture refluxed for a period varying from 30 minutes to 24 hours. The reaction is usually substantially complete in a period of 3 to 12 hours. The reaction may also be carried out in a closed system under pressure. The volatiles are then removed by evaporation, the last traces usually by milling the polymer on differential rolls.

The invention is illustrated in greater detail in the following examples:

EXAMPLE 1

(a) Two hundred grams of polyethylene (average molecular weight (M.W.) 21,000) and a melt index of 2.4–1.5 as measured by A.S.T.M. Test Procedure D1238–52T, were dissolved in 1580 grams of hot cyclohexane and 139 grams of alpha-methacrylic acid were added. The mixture was heated under reflux and with agitation to 80° C. and then 0.695 gram benzoyl peroxide was added. The reaction was vigorous and after 25 minutes the reaction mixture became so viscous that agitation was difficult. The reaction mass was then poured into petroleum ether, filtered, washed twice with petroleum ether and dried. The dried product contained 33.7 percent by weight of polymerized alpha-methacrylic acid by infra-red analysis. It should be noted that all percentages and parts referred to throughout this specification are by weight unless specifically indicated to be otherwise.

(b) Ten grams of the ground product from (a) was dispersed in 100 grams of hot benzene to dissolve the ethylene homopolymer and graft copolymer present. Then this hot solution-dispersion was poured gradually into 1000 ml. of boiling methyl alcohol to dissolve the dispersed alpha-methacrylic acid homopolymer and precipitate the ethylene homopolymer and graft copolymer. The precipitate, so formed, was isolated by filtration, washed with methyl alcohol, redispersed in hot benzene and reprecipitated in methyl alcohol. This extraction process was repeated a total of five times. The third, fourth and fifth extractions yielded a precipitate containing 9.5 percent by weight of polymerized alpha-methacrylic acid which amount was obviously chemically combined with some of the polyethylene, since application of this same extraction procedure to a comparable physical blend of 70 parts of polyethylene (M.W.= 21,000) and 30 parts of poly alpha-methacrylic acid (prepared in cyclohexane), gave after the third extraction a precipitate which contained less than 0.2 percent poly alpha-methacrylic acid.

EXAMPLE 2

Three hundred grams of polyethylene (M.W. 21,000; A.S.T.M. melt index: 2.4–1.5) was dissolved in 2750 grams of cyclohexane and 80 grams of alpha-methacrylic acid were added. The mixture was heated under reflux and with agitation to 80° C. and 0.20 gram benzoyl peroxide was added. The mass was reacted in an atmosphere of nitrogen and at the end of two hours it had become so viscous that agitation was difficult. The reaction mass was poured into petroleum ether and the resulting solid was separated by filtration, washed with petroleum ether and dried at room temperature. The dried product contained 21.2 percent polymerized alpha-methacrylic acid. When extracted with benzene and methyl alcohol by the procedure described in Example 1 the extracted product was found to contain 4.7 percent grafted or bound polymerized alpha-methacrylic acid as determined by infra-red analysis.

The physical properties of molded bars of this dried gross reaction product are compared in Table I with those of polyethylene (M.W. 21,000) injection bars prepared in the same manner. These sample bars were injection molded at 190–200° C. and 10,000 p.s.i. Tensile modulus, elongation and heat distortion are somewhat higher while tensile strength and impact strength are slightly lower for the methacrylic acid-polyethylene reaction product.

Table I

| | Example 2 | Polyethylene |
|---|---|---|
| Percent Methacrylic Acid | 21.2 | 0 |
| Tensile Strength (p.s.i.) | 1,700 | 2,090 |
| Tensile Modulus (p.s.i.) | 23,000 | 17,000 |
| Elongation (percent) | 65.9 | 50.3 |
| Impact Strength −20° F. (ft.-#/in.) | .894 | .95 |
| Heat Distortion Temperature, 66 p.s.i. (° C.) | 48.7 | 44.3 |

EXAMPLE 3

Fifty grams of N-tertiary butyl acryl amide monomer were dissolved along with 100 grams of polyethylene (M.W. 21,000; A.S.T.M. melt index: 2.4–1.5) in 780 grams of cyclohexane. Two portions of 0.25 gram each of benzoyl peroxide were added, one portion at the beginning of the reaction and the second at the end of three hours of reaction. The reaction was continued at 80° C. for a total of 19 hours. The resulting reaction product was poured into a 1:1 by volume mixture of methanol and water and the resulting system was boiled until the odor of cyclohexane had disappeared. The solid precipitate was extracted three times with a 1:1 methanol:water mixture. By this means the unreacted monomer is removed since N-tert. butyl acrylamide is soluble in this mixture while the polymerized N-tert. butyl acrylamide is not. The residue, after extraction of monomer and drying at 80° C., contained 29.5 percent by weight polymerized N-tertiary butyl acrylamide as determined by Kjeldahl nitrogen analysis.

Ten grams of the monomer-free solid product was dried and dissolved in 100 grams of hot benzene. The benzene solution was then poured into 1000 ml. of boiling acetone to extract the N tertiary butyl acrylamide homopolymer and the precipitate collected. This precipitate was boiled repeatedly with 500 ml. of fresh acetone for five times, then dried and analyzed by Kjeldahl nitrogen analysis which showed the presence of about 3.5 percent polymerized N-tertiary butyl acrylamide. That this polymerized N-tertiary butyl acrylamide was in some way chemically bound to the polyethylene was demonstrated by extracting a physical mixture of 20 parts of poly-N-tertiary butyl acrylamide (prepared in cyclohexane) and 80 parts of polyethylene (M.W. 21,000) in a similar manner. Analysis for nitrogen showed that less than 0.1 percent poly-N-tert. butyl acrylamide was present in the second precipitate obtained from this physical blend.

EXAMPLE 4

One part by weight of N-tertiary butyl acrylamide monomer was reacted with two parts by weight of polyethylene (M.W. 21,000; A.S.T.M. melt index: 2.4–1.5) in 15 parts cyclohexane and 0.075 part by weight of benzoyl peroxide added after the manner described in Example 2. The reaction product, after removal of monomer by extraction with methanol-water mixtures and drying, contained 31.4 percent polymerized N-tertiary butyl acrylamide. The physical properties of injection molded (150° C., 10,000 p.s.i.) bars of this product are tabulated in Table II. Compared to unmodified polyethylene (M.W. 21,000) the reaction product is somewhat higher in tensile modulus (stiffness) and heat distortion temperature.

Table II

|  | Example X | Polyethylene |
|---|---|---|
| Percent N-tertiary butyl acrylamide | 31.4 | 0 |
| Tensile Strength (p.s.i.) | 1,717 | 1,800 |
| Tensile Modulus (p.s.i.) | 32,000 | 20,000 |
| Heat Distortion Temp. 66 p.s.i. (° C.) | 50.7 | 41 |

EXAMPLE 5

Three hundred grams of polyethylene (M.W. 21,000) were dissolved in boiling 2400 grams benzene and then 50 grams of acrylic acid and 0.5 gram of benzoyl peroxide (dissolved in 100 cc. benzene) were added and the whole heated under reflux in an atmosphere of nitrogen for about four hours. The hot reaction mixture was poured into a tray and the benzene evaporated off and the product dried in vacuo at 25" and 70° C. The reaction product contained 14 percent by weight of polyacrylic acid of which 40 percent is grafted to the polyethylene.

EXAMPLE 6

Three hundred grams of polyethylene (M.W. 21,000) were dissolved in 2400 grams of boiling benzene and then 100 grams of acrylic acid and 1.0 gram of benzoyl peroxide (dissolved in 100 cc. benzene) were added and the whole heated under reflux for three hours. The hot reaction mixture was poured into an enamel tray and the benzene evaporated off at room temperature (25° C.). The product was further dried in vacuo at 25" and 70° C. The reaction product contained 25 percent polyacrylic acid by weight, 35 percent of which is grafted to the polyethylene.

Samples of film prepared from the representative gross reaction products of Example 2, Example 5 and Example 6 were tested for adhesion to cellophane and aluminum with the following results.

Table III

| Product | Adhesion (gms./inch of width)[1] | |
|---|---|---|
|  | Cellophane | Aluminum |
| Polyethylene (M.W. 21,000) | 5 | 300 |
| Example 5 | 260 | 1,160 |
| Example 6 | about 2,000 | 550 |
| Example 2 | 350 | 450 |

[1] Gms./inch of width required to strip off film which had been pressed onto cellophane or aluminum foil at a temperature of 285–295° F. and 200 p.s.i. for four minutes. The films were between 30 and 40 mils thick.

EXAMPLE 7

(a). Nine hundred and fifty grams of benzene were charged into a glass flask equipped with stirrer and reflux condenser. The benzene was heated to reflux temperature under an atmosphere of nitrogen and 300 grams of polyethylene were gradually added and dissolved with stirring. The polyethylene used had an average molecular weight of 7000, melting point of 100–102° C. and A.S.T.M. needle penetration of 1.2 mm. at 200 g. load for 5 seconds at 25° C. Fifteen grams of distilled methacrylic acid were added and then 3.0 grams of benzoyl peroxide dissolved in 50 grams of benzene. The reaction was continued at reflux temperature for 29.5 hours and then the reaction mixture poured into a shallow tray and air dried overnight. The residual benzene in the reaction product was removed by heating under reduced pressure (25 mm. Hg) at 60–70° C. for about 20 hours. The yield of product was 316 grams and it contained 4.8 percent of methacrylic acid (calculated from the charged weight). The A.S.T.M. needle penetration was 1.0 mm. (The A.S.T.M. needle penetration employed throughout these examples is D-5-47T.) After four successive extractions with hot benzene and methanol by the procedure described in Example 1 a sample had 2.4 percent content by weight of grafted methacrylic acid by infra-red analysis.

(b) Thirty grams of the above gross reaction product (unextracted) was mixed with 15 grams of paraffin wax and heated to 150–160° C. Then 9.0 grams of oleic acid were added. This mixture was gradually added with rapid agitation to 160 grams of boiling water containing 9.0 grams of morpholine. The emulsion was cooled to room temperature. The resulting emulsion was stable and had a 30 percent solids content.

EXAMPLE 8

(a) The graft copolymer was prepared as described in Example 7a. The charge weights were 1000 grams benzene, 300 grams polyethylene, 30.0 grams distilled methacrylic acid and 6.0 grams benzoyl peroxide. The polyethylene used had an average molecular weight of 7000, melting point of 100–102° C. and A.S.T.M. needle penetration of 1.2 mm. at 200 g. load for 5 seconds at 25° C. The methacrylic acid content of the unextracted product was 9.1 percent and of the extracted product 4.2 percent. The A.S.T.M. needle penetration of the unextracted product was 0.8 mm.

(b) A mixture of 38.25 grams of the unextracted product from (a) and 6.75 grams of paraffin wax were heated to 150–160° C. and 9.0 grams of oleic acid added. The hot melt was gradually added with agitation to 160 grams boiling water containing 9.0 grams of morpholine. The emulsion was cooled to room temperature. It was stable and had a solids content of 35 percent.

EXAMPLE 9

(a) A gross reaction product was prepared as described in Example 7a, but using a charge of 500 grams of benzene, 300 grams of polyethylene, 15.0 grams of methacrylic acid and 1.5 grams benzoyl peroxide. The polyethylene used had an average molecular weight of 7000, melting point of 100–102° C. and A.S.T.M. needle penetration of 1.2 mm. at 200 g. load for 5 seconds at 25° C. The resulting product had a methacrylic acid content of 4.8 percent and when extracted, had a methacrylic acid content of 1.8 percent. The unextracted product had an A.S.T.M. needle penetration of 1.0 mm.

(b) Forty-five grams of the product from (a) was heated to 100–102° C. and mixed with 9.0 grams oleic acid and the hot melt was gradually added with stirring to 160 grams of boiling water containing 9 grams of morpholine and stirred until cooled to room temperature. The emulsion was stable having a particle size of from 0.5 to 5 microns. However, a smoother, finer emulsion was obtained when about 15 percent of paraffin (based on the weight of product) was first mixed with the graft copolymer and 45 grams of the mixture emulsified as above described.

EXAMPLE 10

(a) A gross reaction product containing the graft copolymer was prepared as described in Example 7a, but using a charge of 500 grams of benzene, 300 grams of polyethylene, 30.0 grams of methacrylic acid and 3.0 grams of benzoyl peroxide. The polyethylene used had an average molecular weight of 7000, melting point of 100–102° C. and A.S.T.M. needle penetration of 1.2 mm. at 200 g. load for 5 seconds at 25° C. The resulting copolymer had a methacrylic acid content of 9.1 percent and when extracted 4.4 percent. The unextracted product had an A.S.T.M. needle penetration of 0.7 mm.

(b) Forty-five grams of the product from (a) was emulsified as described in Example 9b. The emulsion was stable but viscous. A stable, less viscous emulsion having a particle size of 5–10 microns was prepared by mixing 15 percent paraffin wax with the graft copolymer. The solids content was 21 percent by weight.

EXAMPLE 11

(a) A gross reaction product was prepared as described in Example 7a, using a charge of 500 grams of benzene, 300 grams of polyethylene, 30 grams of methacrylic acid and 1.5 grams of benzoyl peroxide. The polyethylene used had an average molecular weight of 7000, melting point of 100–102° C. and A.S.T.M. needle penetration of 1.2 mm. at 200 g. load for 5 seconds at 25° C. The resulting graft copolymer had a 9.0 percent (by weight) content of polymethacrylic acid and when extracted the polymethacrylic acid content of the extracted product was 5.2 percent. The unextracted product had an A.S.T.M. needle penetration of 0.8 mm.

(b) Forty grams of the product from (a) was ground to a coarse powder and added with stirring to 200 grams of boiling water and then a mixture of 1.5 grams oleic acid and 1.5 grams morpholine were added and the whole mixed in a Waring Blendor for about five minutes. The resulting emulsion was stable and had a solids content of about 15.3 percent.

EXAMPLE 12

(a) The gross reaction product was prepared as described in Example 7a. The charge was 500 grams of benzene, 300 grams of polyethylene, 30 grams of methacrylic acid and 1.5 grams of benzoyl peroxide. The polyethylene used had an average molecular weight of 7000, melting point of 100–102° C. and A.S.T.M. needle penetration of 1.2 mm. at 200 g. load for 5 seconds at 25° C. The resulting graft copolymer had a polymethacrylic acid content of 8.5 percent and when extracted 3.5 percent. The unextracted product had an A.S.T.M. needle penetration of 0.8 mm.

(b) Forty grams of the product from (a) were powdered and added with stirring to 200 grams of boiling water and then a mixture of 3 grams of oleic acid and 3 grams of morpholine were added and the whole mixed in a Waring Blendor. The resulting emulsion was stable and the solids content was 15.6 percent.

EXAMPLE 13

(a) Ninety grams of polyethylene were dissolved in 92.5 grams of boiling benzene and then 10 grams of acrylic acid and 1 gram of benzoyl peroxide (dissolved in 10 grams benzene) were added. The polyethylene used had an average molecular weight of 4000, melting point of 92–94° C. and A.S.T.M. needle penetration of 4.4 mm. at 25° C. The whole was heated under reflux for 22 hours and then the hot reaction mixture poured into an enameled tray and the benzene evaporated off at room temperature. The product was then dried in vacuo at 25″ and 70° C. temperature. The A.S.T.M. needle penetration was 3.5 mm.

(b) Forty-five grams of the product from (a) were heated to 115° C. and added 9 grams of oleic acid and 9 grams of morpholine. The hot melt was poured into 200 grams boiling water and cooled. The emulsion formed was filtered through a fine metal screen. The solids content of the stable filtered emulsion was 10 percent by weight.

EXAMPLE 14

(a) The gross reaction product was prepared as described in Example 5a. The charge weight was 1000 grams of benzene, 300 grams of polyethylene, 15.0 grams of distilled methacrylic acid and 3 grams of benzoyl peroxide. The polyethylene used had an average molecular weight of 5000, melting point of 108–110° C. and A.S.T.M. needle penetration of 0.5 mm. at 25° C. The resulting product contained 5 percent methacrylic acid. The A.S.T.M. needle penetration of the product was 0.4 mm.

(b) Forty-five grams of the product from (a) were heated to 100–120° C. and mixed with 9.0 grams oleic acid and the hot melt was gradually added to 160 grams of boiling water containing 9.0 grams of morpholine and the resulting emulsion cooled to room temperature. The emulsion was stable and contained about 29 percent solids.

EXAMPLE 15

(a) The gross reaction product was prepared as described in Example 7a but using polyethylene having an average molecular weight of 1500, melting point of 95–97° C. and A.S.T.M. needle penetration of 1.6 mm. at 25° C. and 1.5 grams of benzoyl peroxide. The A.S.T.M. needle penetration of the product was 1.4 mm.

(b) The emulsion was prepared as described in Example 7b using the graft copolymer of (a). The emulsion was stable and contained about 28 percent solids.

We claim:

1. A process for preparing a thermoplastic graft copolymer of polyethylene which consists in reacting polyethylene dissolved in solvent therefor, selected from the group consisting of hydrocarbons and chlorinated hydrocarbons, with a compound having the general formula:

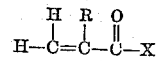

wherein R is a member selected from the group consisting of hydrogen and methyl and X is a member selected from the group consisting of hydroxy and lower alkyl substituted amino radicals in the presence of a free radical polymerization catalyst.

2. A process according to claim 1 in which the free radical polymerization catalyst is a peroxide catalyst.

3. A process according to claim 1 in which the free radical polymerization catalyst is a peroxide catalyst and R is a methyl group and X is a hydroxy group.

4. A process according to claim 1 in which the free radical polymerization catalyst is a peroxide catalyst and R is a hydrogen atom and X is an N-tertiary butyl amino radical.

5. Process for preparing an emulsifiable graft copolymer of polyethylene which consists in reacting polyethylene dissolved in solvent therefor, selected from the group consisting of hydrocarbons and chlorinated hydrocarbons, with a compound having the general formula:

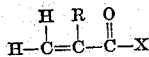

wherein R is a member selected from the group consisting of hydrogen and methyl and X is a member selected from the group consisting of hydroxy and lower alkyl substituted amino radicals in the presence of a peroxide polymerization catalyst.

6. A process according to claim 5 in which the reaction period is from about 10 to about 15 hours.

7. A thermoplastic graft copolymer of polyethylene when produced according to the process of claim 1, said graft copolymer being further characterized as being homopolymeric ethylene chains having attached thereto side chains of a homopolymer of a monoethylenic compound having the general formula:

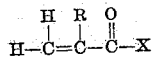

wherein R is a member selected from the group consisting of hydrogen and methyl and X is a member selected from the group consisting of hydroxy and lower alkyl substituted amino radicals, each of said side chains being attached to said homopolymeric ethylene chain through a carbon to carbon bond in which one carbon atom of said bond is a non-terminal carbon atom of said homopolymeric chain.

8. A thermoplastic graft copolymer of polyethylene described in claim 7 in which the homopolymeric side chains attached to the polyethylene are polymers of alpha-methacrylic acid.

9. A thermoplastic graft copolymer of polyethylene described in claim 7 in which the homopolymeric side chains attached to the polyethylene are polymers of acrylic acid.

10. A homogeneous thermoplastic composition consisting essentially of ethylene homopolymer and the graft copolymer described in claim 7.

References Cited in the file of this patent

UNITED STATES PATENTS

| 2,405,817 | D'Alelio | Aug. 13, 1946 |
| 2,497,323 | Roedel | Feb. 14, 1950 |
| 2,794,793 | Coover | June 4, 1957 |
| 2,837,496 | Vandenberg | June 3, 1958 |

FOREIGN PATENTS

| 750,923 | Great Britain | June 20, 1956 |
| 499,577 | Canada | Jan. 26, 1954 |